United States Patent
Bruening et al.

(10) Patent No.: US 8,402,224 B2
(45) Date of Patent: Mar. 19, 2013

(54) THREAD-SHARED SOFTWARE CODE CACHES

(75) Inventors: Derek L. Bruening, Troy, NY (US); Vladimir L. Kiriansky, Cambridge, MA (US); Tim Garnett, Boston, MA (US); Sanjeev Banerji, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 1915 days.

(21) Appl. No.: 11/533,712

(22) Filed: Sep. 20, 2006

(65) Prior Publication Data

US 2007/0067573 A1 Mar. 22, 2007

Related U.S. Application Data

(60) Provisional application No. 60/718,938, filed on Sep. 20, 2005.

(51) Int. Cl.
*G06F 12/00* (2006.01)
(52) U.S. Cl. ................... 711/135; 718/100
(58) Field of Classification Search .......... 711/130, 711/135; 718/100
See application file for complete search history.

(56) References Cited

U.S. PATENT DOCUMENTS

| | | | | |
|---|---|---|---|---|
| 5,842,016 | A * | 11/1998 | Toutonghi et al. | 718/106 |
| 7,328,438 | B2 * | 2/2008 | Armstrong et al. | 718/100 |
| 7,725,885 | B1 * | 5/2010 | Pradhan et al. | 717/148 |
| 7,805,710 | B2 * | 9/2010 | North | 717/136 |
| 2005/0010729 | A1 * | 1/2005 | Silvera et al. | 711/150 |
| 2005/0198649 | A1 * | 9/2005 | Zakonov | 719/318 |

OTHER PUBLICATIONS

Derek Bruening, "Efficient, Transparent, and Comprehensive Runtime Code Manipulation" 2004.*
Jian Li, Jose F. Martinez, and Michael C. Huang, "The Thrifty Barrier: Energy-Aware Synchronization in Shared-Memory Multiprocessors", Feb. 2004.*
A. Adl-Tabatabi et al., "Fast, effective code generation in a just-in-time Java compiler," ACM SIGPLAN Conf. on Programming Language Design and Implementation (PLDI 1998), p. 280-290.
B. Aplern et al., "The Jalapeno virtual machine," IBM Systems Journal, 39(1), 2000.
M. Arnold, "Adaptive optimization in the Jalapeno JVM," ACM SIGPLAN Conf. on Object-Oriented Programming Systems, Languages, and Applications (OOPSLA 2000), p. 47-65.
V. Bala et al., "Dynamo: A transparent runtime optimization system," ACM SIGPLAN Conf. on Programming Language Design and Implementation (PLDI 2000), p. 1-12.
D. Bruening et al., "Maintaining consistency and bounding capacity of software code caches," Int. Symp. on Code Generation and Optimization, (CGO Mar. 2005, San Jose, CA), p. 74.8.
D. Bruening et al., "Efficient, Transparent, and Comprehensive Runtime Code Manipulation," PhD thesis, M.I.T. Sep. 2004.
E. Bugnion et al., "Disco: Running commodity operating systems on scalable multiprocessors," 16th ACM Symp. on Operating System Principles (SOSP 1997), p. 143-156.
W. Chen et al., "Mojo: A dynamic optimization system," 3rd ACM Workshop on Feedback-Directed and Dynamic Optimization (FDDO-3), 2000, p. 81-90.
A. Chernoff et al., "FX!32: A profile-directed binary translator," IEEE Micro, 18(2) (Mar. 1998), p. 56-64.
C. Cifuentes et al., "Walabout: A retargetable dynamic binary translation framework," 4th Workshop on Binary Translation, 2002.

(Continued)

*Primary Examiner* — Kalpit Parikh

(57) ABSTRACT

A runtime system using thread-shared code caches is provided which avoids brute-force all-thread-suspension and monolithic global locks. In one embodiment, medium-grained runtime system synchronization reduces lock contention. The system includes trace building that combines efficient private construction with shared results, in-cache lock-free lookup table access in the presence of entry invalidations, and a delayed deletion algorithm based on timestamps and reference counts. These enable reductions in memory usage and performance overhead.

14 Claims, 5 Drawing Sheets

OTHER PUBLICATIONS

R. F. Cmelik et al., "Shade: A fast instruction-set simulator for execution profilling," ACM SIGMETRICS Performance Evaluation Review, 22(1) (May 1994), p. 128-137.

Microsoft Virtual PC 2007, http://www.microsoft.com/windows/virtualpc/default.mspx, printed Mar. 15, 2007.

J.C. Dehnert et al., "The Transmeta code morphing software: Using speculation, recovery, and adaptive retranslation to address real-life challenges," Int. Symp. on Code Generation and Optimization (CGO 2003), p. 15-24.

G. Desoli et al., "DELI: A new run-time control point," 35th Int. Symp. on Microarchitecture (MICRO 2002), p. 257-268.

L.P. Deutsch et al., "Efficient implementation of the Samlltalk-80 system," ACM SIGPLAN-SIGACT Symp. on Principles of Programming Languages (POPL 1984), p. 297-302.

U. Drepper et al., "The Native POSIX Thread Library for Linux," http://people.redhat.com/drepper/nptl-design.pdf., Feb. 21, 2005.

E. Duesterwald et al., "Software profiling for hot patch prediction: Less is more," 12th Int. Conf. on Architectural Support for Programming Languages and Operating Systems, (ASPLOS 2000), p. 202-211.

K. Ebcioglu et al., "DAISY: Dynamic compilation for 100% architectural compatibility," 24th Int. Symp. on Computer Architecture, (ISCA 1997), p. 26-37.

U. Holzle, "Adaptive Optimization for Self: Reconciling High Performance with Exploratory Programming," Ph.D. thesis, Stanford University 1994.

Intel Corp., "A-32 Intel Architecutre Software Developer's Manual," vol. 3, section 7.1, Jun. 2005.

"Pin: A Binary Instrumentation Tool," http://rogue.colorado.edu/Pin/., printed on Mar. 15, 2007.

A. Klaiber, "The technology behind Crusoe processors," Transmeta Corporation, http://transmeta.com/pdfs/paper_aklaiber_19jan00.pdf, Jan. 2000.

D. C. Lee et al., "Execution characteristics of desktop applications on Windows NT," 25th Int. Symp. on Computer Architecture (ISCA 1998), p. 27-38.

P.S. Magnusson et al., "SimICS/sun4m: A virtual workstation," USENIX Annual Technical Conference, 1998, p. 119-130.

McAfee Inc., VirusScan, http://www.mcafee.com/, printed Mar. 15, 2007.

N. Nethercote et al., "Valgrind: A program supervision framework," 3rd Workshop on Runtime Verification (RV 2003).

A. Robinson, A., "Why dynamic translation?" Transitive Technologies Ltd., May 2001, http://www.transitive.com/documents/Why_Dynamic_Translation1.pdf.

K. Scott et al., "Reconfigurable and retargetable software dynamic translation," Int. Symp. on Code Generation and Optimization (CGO 2003), p. 36-47.

V.C. Sreedhar et al., "A framework for interprocedural analysis and optimization in the presence of dynamic class loading," ACM SIGPLAN Conf. on Programming Language Design and Implementation (PLDI 2000), p. 208-218.

Standard Performance Evaluation Corporation, SPEC JVM Client98 benchmark, http://www.spec.org/osg/jvm98, printed Mar. 15, 2007.

Web Wiz Guestbook, http://www.webwizguide.info/asp/sample_scripts/guestbook_script.asp, printed Mar. 15, 2007.

E. Witchel, et al., "Embra: Fast and flexible machine simulation," 1996 ACM SIGMETRICS Conf. on Measurement and Modeling of Computer Systems, p. 68-79.

C. Zheng et al., "PA-RISC to IA-64: Transparent execution, no recompilation," IEEE Computer, 33(3) (Mar. 2000), p. 47-53.

* cited by examiner

THREAD-SHARED SOFTWARE CODE CACHES

CROSS-REFERENCE TO RELATED APPLICATIONS

This application claims the benefit of U.S. provisional patent application No. 60/718,938, filed Sep. 20, 2005, incorporated herein by reference.

BACKGROUND OF THE INVENTION

Dynamic tools and other systems that operate at runtime often employ software code caches to store frequently executed sequences of translated or instrumented code for use on subsequent executions, thereby avoiding the overhead of re-translation. While caches can improve performance, their size must be carefully managed to avoid occupying too much memory and ultimately degrading performance. They also must be kept consistent with their corresponding original application code. Both tasks are complicated by the presence of multiple threads.

Any code caching system that targets applications with multiple threads faces a choice: increase memory usage by using thread-private caches, or increase the complexity of cache management by sharing the code cache among the multiple threads. Some systems opt to not support multiple threads, in particular some simulators and emulators that model a single processor. Those that support multiple threads but choose thread-private caches enjoy straightforward cache management, synchronization, and scratch space, and work well on applications with little code sharing among threads, such as interactive desktop programs. However, as discussed further below (e.g., Section 1), modern server applications have significant amounts of sharing among threads, and thread-private caches use prohibitive amounts of memory, resulting in poor performance on these programs.

Existing systems that use thread-shared caches typically solve the thorny problem of evicting code from the cache via a brute-force solution: suspend all other threads or otherwise force them out of the cache immediately. This solution requires that cache management be kept to a minimum, which may not be practical for applications that incur many cache invalidations. Suspension also does not scale well on multi-processor machines where it prevents concurrent execution. Among other disadvantages, these shortcomings limit the applicability of such systems in production environments.

SUMMARY OF THE INVENTION

The present invention addresses the above and other issues.

In one embodiment, a computer implemented method for using a code cache includes caching code and sharing the cached code among multiple threads while avoiding brute-force all-thread-suspension. The sharing can also include avoiding monolithic global locks.

The method can include deleting a block of code from the code cache by unlinking the block to make it unreachable prior to removing the block, and/or deleting a block of code from the code cache when all threads that were in the cache at the time of making a target block unreachable have exited the code cache at least once. The method can further include using timestamps to determine whether a thread has exited the cache since making a target block unreachable. Reference counting can be used to find the last thread to exit the cache.

The sharing can include sharing blocks of code across threads by using medium-grained runtime system synchronization to reduce lock contention. The medium-grained runtime system synchronization can require that no runtime system lock is held while in the code cache. A lock can be used for controlling additions to the code cache and a lock can be used for controlling changes in links between existing code in the code cache. A lock can be held across looking up, building, and adding a new basic block to the code cache. A lock can further be used for controlling changes in links between existing code in the code cache hy holding the lock across any changes to the link state of a block of code in the code cache.

The sharing can also include using trace building that combines private construction with shared results, where the trace building includes using thread-private temporary data structures to build up traces and only synchronizing at a point where a trace is ready to be emitted into the code cache. The trace building can include setting a flag for a shared trace head once trace building has started from the shared trace head to prevent concurrent trace building.

The sharing can also include synchronizing thread-shared tables with other threads in runtime system code to coordinate concurrent writes to the table and to make sequences of reads and writes atomic, where the synchronizing includes at least one of using read-write locks and making key table operations atomic with respect to reads from the code cache. The key table operations can include adding a new target block, invalidating a block and resizing a table. Lock-free table reads can also be provided from the code cache in the presence of table entry invalidations.

In another embodiment, a computer includes a storage device, a communication interface and one or more processors in communication with the storage device and the communication interface. The one or more processors implement a code cache that is shared among different threads while avoiding brute-force all-thread-suspension and monolithic global locks.

In yet another embodiment, one or more processor readable storage devices store processor readable code for programming one or more processor to perform a method which includes implementing a code cache and sharing the code cache among threads while avoiding brute-force all-thread-suspension and monolithic global locks.

DETAILED DESCRIPTION

Figure 1:
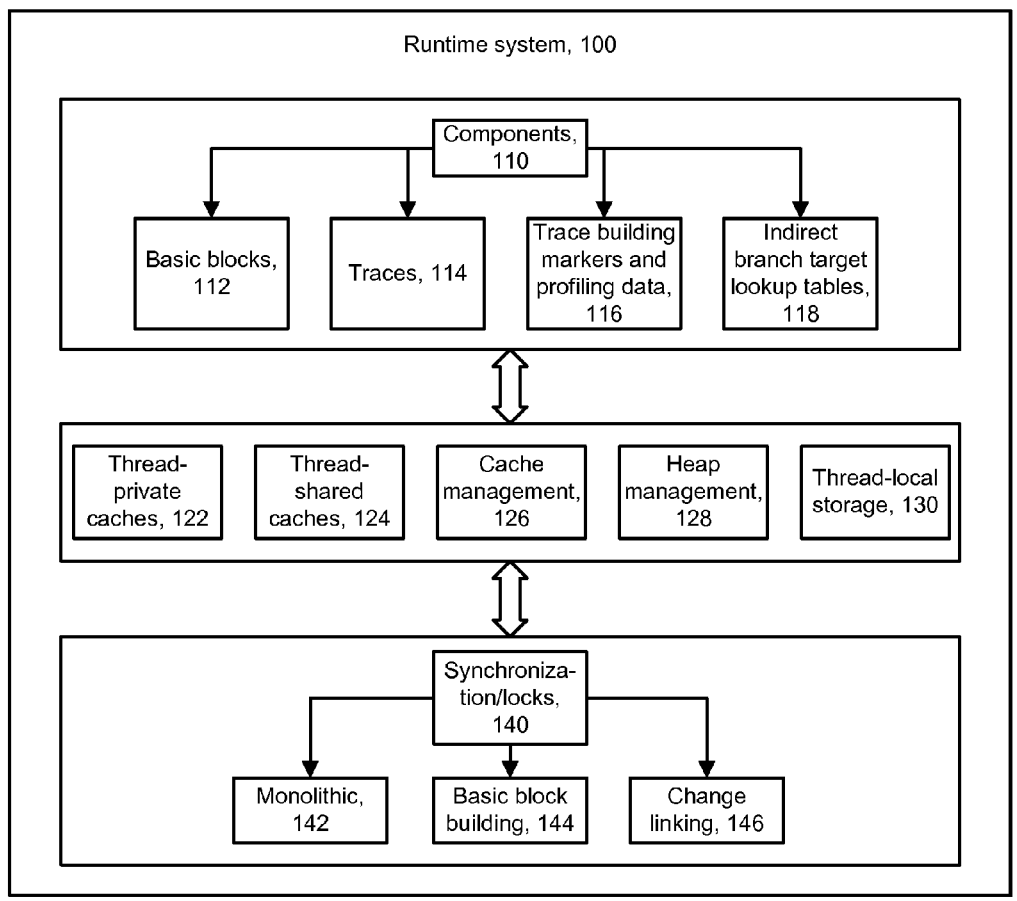
FIG. 1 illustrates an embodiment of a runtime system in which the present invention may be implemented.

As mentioned at the outset, software code caches are increasingly being used to amortize the runtime overhead of dynamic optimizers, simulators, emulators, dynamic translators, dynamic compilers, and other tools. Despite the nowwidespread use of code caches, they are not often shared among multiple threads. Some systems simply do not support threads, while others resort to thread-private code caches. Although thread-private caches are much simpler to manage, synchronize, and provide scratch space for, they simply do not scale when applied to many-threaded programs. Thread-shared code caches are needed to target server applications which employ, e.g., hundreds of worker threads all performing similar tasks. Yet, those systems that do share their code caches often have brute-force, inefficient solutions to the challenges of concurrent code cache access: a single global lock on runtime system code and suspension of all threads for any cache management action. This limits the possibilities for cache design and has performance problems with applications that require frequent cache invalidations to maintain cache consistency.

Below, we discuss design choices when building thread-shared code caches and enumerate the difficulties of thread-local storage, synchronization, trace building, in-cache lookup tables, and cache eviction. We present efficient solutions to these problems that both scale well and do not require thread suspension. We evaluate our results in an industrial-strength dynamic instrumentation system on real-world server applications. On these applications our thread-shared caches use an order of magnitude less memory and incur half the performance overhead of thread-private caches.

In particular, we provide a discussion of the design space and the key challenges of building thread-shared code caches. We analyze the need for sharing and the impact of thread-shared caches, which use an order of magnitude less memory and incur half the performance overhead of thread-private caches (Section 1). We discuss the choices of what to share (Section 2) and how to provide scratch space (Section 3). Further contributions lie in specific solutions to various problems such as synchronization (Section 4), trace building (Section 5), in-cache indirect branch lookup tables (Section 6), and code cache eviction (Section 7).

1. Sharing Prevalence and Impact

A major design decision for any code caching system that supports multiple application threads is whether to use thread-shared or thread-private code caches. Thread-shared caches reflect the original application code, which lives in a thread-shared address space. However, thread-private caches are much simpler to manage for consistency and capacity, require no synchronization for most operations, can use absolute addresses for thread-local scratch space (Section 3), and support thread-specific specialization for optimization or instrumentation.

To illustrate the challenges of thread-shared caches, consider the seemingly simple task of removing a block of code from the thread-shared code cache. It cannot be removed until it is known that no threads are executing inside that block. Yet, instrumentation of every block is too expensive, as is suspending every single thread to discover where it is every time a block needs to be removed (which may be frequent for purposes of cache consistency: Section 7.2). Thread-shared caches require more complex and sophisticated algorithms, explaining why multithreaded runtime systems often choose to have some or all of their caches be thread-private.

Thread-private caches do have an obvious and significant disadvantage: duplication of code in multiple threads' caches. The scope of this depends on the amount of code shared among threads. Desktop applications have been shown to share little code, with a primary thread performing most of the work and the other threads executing disparate tasks. However, server applications deliberately spawn threads to perform identical jobs. Typically between one-half and three-quarters or more of all blocks are shared by at least two threads, and typically by tens of threads. This is strikingly different from desktop applications, which share less than two percent of their blocks in batch usage and less than ten percent in interactive scenarios.

Although significant research attention has been given to exploring highly scalable event-driven architectures, commercial server applications are mostly based on multi-threaded architectures. The concurrency model of our target server applications is based on pools of worker threads that handle connections and requests. Heuristics are used to control scalability by dynamic sizing of the number of threads: reacting to system load, expanding for bursty workloads, and shrinking after periods of inactivity, all within configurable minimums and maximums. SQL Server also supports lightweight pooling based on fibers, user-mode-scheduled threads of execution that reduce context switching overheads, with real (kernel-mode-scheduled) threads used only to migrate across processors. The best vendor-reported TPCC benchmark scores for SQL Server are produced in fiber mode, and our dynamic instrumentation system seamlessly supports fibers. Yet lightweight pooling is not enabled by default and is generally not recommended due to incompatibilities with various extensions, e.g., incorrect expectations for thread local storage. In our goal to provide a transparent platform, we strive to provide minimal performance degradation not only for applications tuned for optimal native execution workloads but also for sub-optimally designed or configured applications. We must also not perturb self-tuning heuristics. Our benchmarks therefore use the default thread worker model for SQL Server and default thread pool parameters for IIS, in one embodiment.

We evaluated the performance and memory usage of our dynamic instrumentation system using both thread-private and thread-shared caches, implementing the designs described in the following sections. The results show that thread-shared caches are a clear winner for server applications. Typically shared caches achieve up to four times the throughput of private caches, due to reduced pressure in the hardware instruction cache, instruction TLB, branch predictors, branch target buffer, and other address-indexed structures. Since server threads are often executing for a short amount of time, and when blocked or pre-empted may be replaced by a possibly related thread, frequent context switching is a lot less expensive with shared caches.

Even more dramatic is the memory usage. We have observed up to 50 times reduction of the working set size when using a shared cache instead of thread-private caches. The memory expansion from thread-private code caches quickly becomes egregious when the thread count numbers in the hundreds. Thread-shared code caches bring memory usage down to a reasonable level and avoid scalability limits.

2. Sharing Choices

FIG. 1 illustrates an embodiment of a runtime system in which the present invention may be implemented. The runtime system shown generally at 100 includes different components 110, including basic blocks 112, traces 114, trace building markers and profiling data 116 and indirect branch target lookup tables 118. The components interact with thread-private caches 122, thread-shared caches 124, a cache management function 126, a heap management function 128 and thread-local storage 130 (see also Section 3). A synchronization/locks function 140 includes monolithic locks, basic block building locks 144 and change linking locks 146 (see also Section 4).

Each component of a runtime system can be separately made thread-shared or thread-private: basic blocks, traces, trace building markers and profiling data, and indirect branch target lookup tables. Mixtures can also be used. For example, even when using thread-shared basic blocks in general, our system keeps basic blocks that correspond to self-modifying application code in a thread-private cache to allow quick synchronization-free deletion when modifications are detected.

In addition to the code cache, every runtime system maintains associated data structures for managing the cache and its blocks. Runtime system heap management parallels cache management, with thread-private requiring no synchronization and thread-shared requiring assurance that no thread holds a pointer to a structure before it can be freed. Whether pointers to private structures are allowed inside shared structures, or vice versa, is another source of complexity. In one embodiment, our system avoids such arrangements.

With an all-shared or an all-private code cache, links between blocks have no unusual restrictions. However, when mixing shared and private, links between the two require care. Private code can target shared code with no extra cost, but shared code must dispatch by thread or use indirection through a thread-local pointer to reach the private code for the executing thread. If any type of cross-cache links is allowed, data structure management becomes more complicated. If lists of incoming links are used for proactive linking and fast unlinking, the system can end up with pointers to shared data embedded in private data structures. As we mentioned above, we do not want to support this mixture and thus do not allow cross-cache links, in one embodiment. This is not problematic due to our rare use of thread-private blocks, which we only use for cases such as self-modifying code that are not often on critical performance paths.

Figure 2:
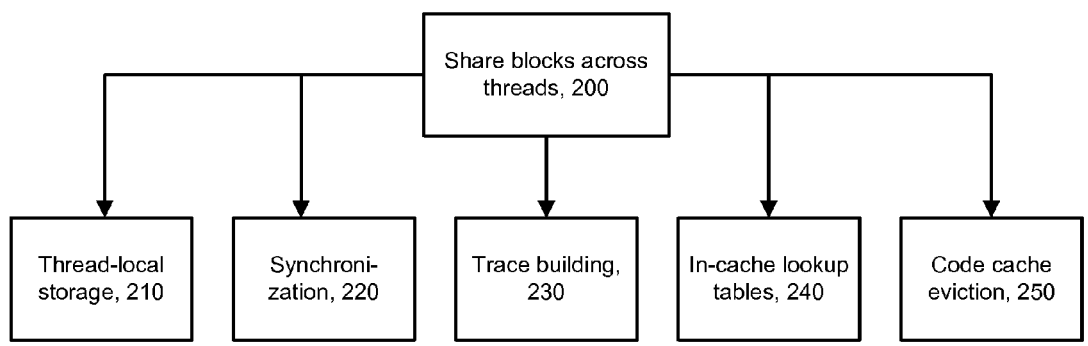
FIG. 2 depicts a system for sharing blocks of code across multiple threads.

FIG. 2 depicts a system for sharing blocks of code across multiple threads, and provides an overview for the discussion of Sections 3-7, below. The system for sharing 200 generally includes providing thread-local storage 210, synchronization 220, trace building, in-cache lookup tables 240 and code cache eviction 250, each of which is discussed in further detail below.

3. Thread-Local Storage

Figure 3:
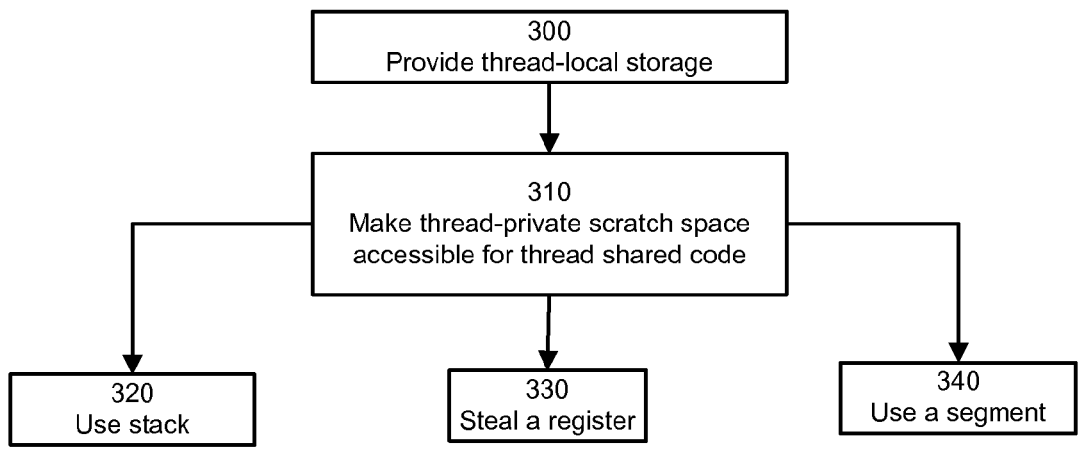
FIG. 3 depicts a process for providing thread-local storage.

FIG. 3 depicts a process for providing thread-local storage, as indicated at step 300. Note that in these and other flowcharts, not all steps are necessarily discrete and/or performed in the order indicated. The process includes making thread-private scratch space available for thread shared code (step 310). Generally, any runtime system requires scratch space to be available at arbitrary points during application execution, in order to operate while preserving application state. The simplest, most efficient, and most transparent form of scratch space access is absolute addressing, as it does not affect application register or stack usage. It requires the underlying architecture to support it, which IA-32, our target, does. However, absolute addressing only works well with thread-private caches. For thread-shared code we need scratch space that is accessible via a shared instruction. Our choices are using the stack (step 320), which is neither reliable nor transparent; stealing a register (step 330), which incurs a noticeable performance hit on the register-poor IA-32 architecture; and using a segment (step 340), which is not available on all platforms but is on IA-32.

Segments are used by both Windows and Linux, for instance, to provide thread-local storage space. We can either use the same space and try not to interfere with the application's slots, or we can create our own segment and steal a segment register. The offset of our scratch space from the segment base must be a known constant. In one approach, our system can use Windows-provided thread-local storage, which requires reverse-engineering its allocation scheme to determine the offsets. Our system uses Windows-provided thread-local storage. Windows provides 64 storage slots within each thread's segment, with an additional 1024 entries added in Windows 2000 but which require an extra indirection step to access and so cannot be used as primary scratch space. Our system abides by the storage's allocation scheme to prevent conflicts with the application. To avoid indirection and thus improve performance we use multiple slots, and transparency problems are still possible when we compete for this limited resource with applications with hard requirements for direct access.

When mixing thread-shared and thread-private code, one approach is to use segment space for the shared code and absolute addressing pointing at a different location for the private code. In an alternative experimental configuration with shared basic blocks and private traces, the portion of the trace's code coming from its constituent blocks used the segment space while the newly generated part of the trace used the absolute space. This mix increased the data cache footprint enough to cause a noticeable performance hit. Absolute addressing can be mixed with segment addressing, but they should both point at the same linear addresses for best performance.

4. Synchronization

Figure 4:
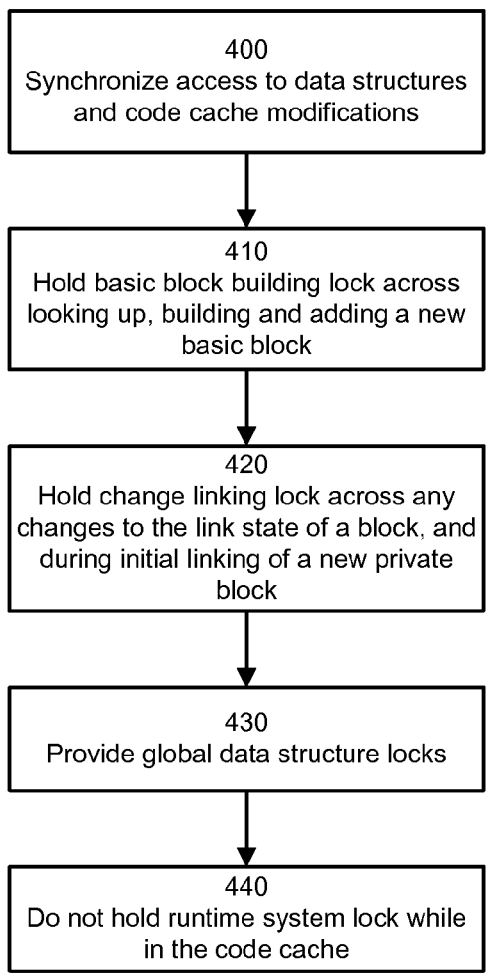
FIG. 4 depicts a synchronization process.

FIG. 4 depicts a synchronization process. Sharing blocks across threads requires synchronized access to data structures and code cache modifications (step 400). In one approach, the sharing can use a single monolithic lock for all runtime system code, where only one thread could be out of the code cache at a time. However, in this approach contention on this lock was high and performance suffered. Most of this overhead is only incurred at startup and mostly impacts short workloads, while longer continuous workloads spend less time in the runtime system and consequently are less affected in steady state. If thread-private data structures need to be populated, bursty workloads may also see some impact whenever thread pools shrink and expand.

Surprisingly, though, only a slightly finer-grained approach is required to achieve good performance. We use two main locks: a basic block building lock that is held across looking up, building, and adding a new basic block; and a change linking lock that is held across any changes to the link state of a block (FIG. 4, step 410), including replacing any placeholder containing state for the new block to assume (such as persistent basic block profiling data that preserve execution counts across block deletion). If private blocks exist and any form of cross-cache linking is allowed, then the change linking lock must be held during private block linking as well (step 420). Additionally, if trace headness is shared (see Section 5), the lock is required during initial linking of a new private block (when trace headness is discovered). The contention on these two finer-grained locks is substantially lower than with the monolithic approach.

In addition to these high-level operation locks, each global data structure requires its own lock (step 430). These include block lookup hashtables, tables mapping code cache addresses to application addresses, and code cache free lists.

These locks must be efficient to avoid contention. Using spin locks or thread yields is not sufficient, as block lookups are on a relatively critical path. We found that only with fast read-write locks where a reader incurs very little overhead and all contention is handled by operating system-supported waits and notifies could we eliminate all performance impact of our locks.

Our runtime system, since it operates on multithreaded applications, must also be careful with interactions of its own synchronization with that of the application. A thread in the code cache should be executing completely in the application's context and should not hinder execution of runtime system code. In one embodiment, our invariant is that no runtime system lock can be held while in the code cache (step 440). This greatly simplifies both the safe points necessary for supporting application threads suspending each other and the synchronization needed for code cache consistency, as discussed in Section 5.

5. Trace Building

Figure 5:
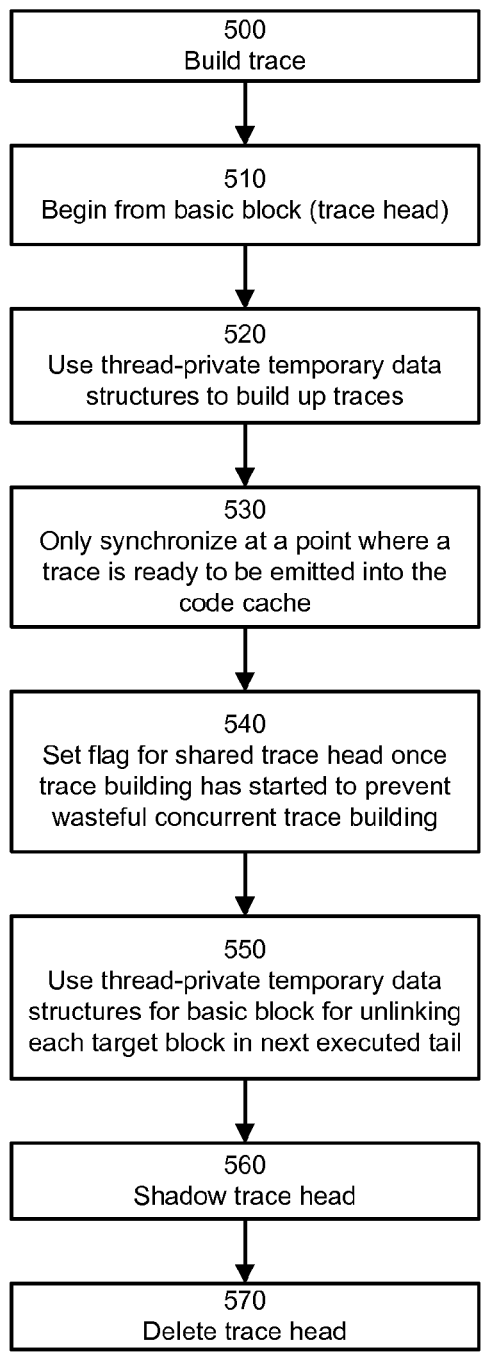
FIG. 5 depicts a trace building process.

FIG. 5 depicts a trace building process. Step 500 refers to building a trace. The mechanisms of trace building in a shared code cache require more changes and decisions than simply applying locks at the appropriate points in a private trace building scheme. This section discusses building Next Executing Tail (NET) traces, which each begin from a basic block called a trace head (step 510). Traditional NET trace heads focus on loops by including targets of backward branches as well as exits from existing traces. Trace heads are profiled, and as soon as a trace head's execution counter exceeds a threshold value, the subsequent sequence of basic blocks that is executed after the trace head is concatenated together to become a new trace. In this scheme there are several independent choices of what to share and what remains thread-private: basic blocks, trace headness (whether a basic block is considered a trace head), trace head counters, and traces themselves. Hybrid choices are also possible, where some traces are private and some (perhaps those found to be common) are promoted to shared traces, or the reverse where shared traces are turned into thread-private traces for thread-specific specialization.

While trace headness sharing is typically tied to basic block sharing, and trace head counter sharing is typically tied to sharing traces themselves, the connections are not necessary. Having counters shared but traces private could be desirable if trace-specific optimizations are performed on the traces, or if shared thread-local storage is expensive and private blocks have a performance advantage. Different mixtures of sharing require different bookkeeping. One setup had private traces and shared basic blocks, though basic blocks with hard-to-share characteristics (such as self-modifying code) were kept private. Shared basic blocks and private traces work most naturally with shared trace heads but private trace head counters. The possibility of private basic blocks, though, complicates matters, as shared trace headness must be kept track of for each private basic block in case a corresponding shared block is ever built.

Regardless of the exact algorithm for building traces, they typically involve multiple trips in and out of the code cache to determine the sequence of basic blocks to include in the trace. That is, NET trace building involves executing basic blocks one at a time, incrementally discovering the hot path during the next execution after a trace head becomes hot. Given our invariant of no locks while in the code cache (Section 4), in one embodiment, this rules out a giant trace building lock. Instead, we use thread-private temporary data structures to build up traces (step 520) and only synchronize at the point where a trace is ready to be emitted into the code cache (step 530). Trace building work will be wasted if two threads concurrently build the same trace, as one must discard its trace. This race is not uncommon. A flag set on the trace head indicating that trace building has commenced eliminates the problem (FIG. 5, step 540), even if the flag lookup-and-set is not atomic, as an occasional race is not prohibitive. Without this flag, many duplicate traces would be simultaneously built and wasted.

Each target block in the next executed tail must be unlinked in order to return to the runtime system and continue the process. Since we cannot hold a lock while in the code cache, we cannot prevent the target block from being re-linked by another trace in progress or otherwise being modified. We solve this by again using thread-private temporary structures, this time for the basic block itself (step 550). This also avoids disrupting other threads by eliminating unlinking of shared blocks.

If both traces and basic blocks are shared, a trace head is no longer needed once a shared trace has been built from it. As block deletion is an involved operation in a shared cache (Section 7.2), one option is to not delete the head but shadow it (step 560). Shadowing makes the head inaccessible by ensuring that trace has precedence in all lookup tables and by shifting the trace head's links to the trace. If the trace is later deleted, the links can be shifted back to restore the head. However, as this does waste space, our system deletes a trace head using our two-step lazy deletion (Section 7) as soon as its corresponding trace is emitted, in one embodiment (step 570).

6. In-Cache Lookup Tables

Figure 6:
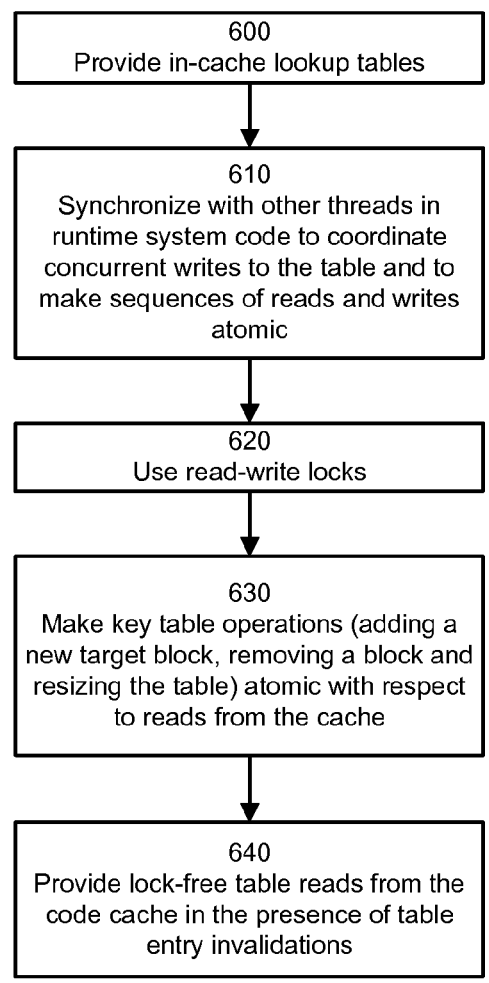
FIG. 6 depicts a process for providing in-cache lookup tables.

FIG. 6 depicts a process for providing in-cache lookup tables. Step 600 refers to providing an in-cache lookup table. In a software code cache, indirect branches must be dynamically resolved by looking up the corresponding code cache address for a given application address. These indirect branch lookup tables present more synchronization complications than other runtime system data structures because they are accessed from the code cache and are on the critical performance path. A runtime system's performance has been shown to be primarily limited by its indirect branch performance, which is the only aspect of code cache execution that differs significantly from native execution.

As with the other components, lookup tables can be made thread-shared or thread-private. Even if all blocks are shared, thread-private tables simplify table entry deletion and table resizing, as described below. Private tables do occupy more memory than shared, but they do not significantly impact scalability the way thread-private basic blocks and traces do. In our benchmarks, the total memory usage of thread-shared blocks is four times greater than the memory usage from thread-private lookup tables. The main disadvantage of thread-private tables is that the table of every thread must be traversed in order to remove a shared block. There is also additional data cache pressure.

Thread-shared tables require synchronization with other threads in runtime system code to coordinate concurrent writes to the table as well as to make sequences of reads and writes atomic (step 610). We use read-write locks to accomplish this (step 620). However, we can avoid the cost of a read lock for the in-cache lookup if we make the key table operations atomic with respect to reads from the cache (step 630). The key operations are: adding a new target block; removing a block by invalidating its table entry; and resizing the table.

As a result, we provide lock-free table reads from the code cache in the presence of table entry invalidations (step 640).

Adding a new block can be made atomic with respect to table reads from the cache by first adding subsidiary fields and only then using a single atomic write to the primary tag field to enable the new entry. Removing entries is a little more difficult and depends on the type of collision chaining. We use an open-address hashtable, where shifting on deletion produces shorter collision chains than using a sentinel. However, shifting cannot be used without a read lock in the cache. One solution is to use a sentinel to invalidate the entry that is not a hit but does not terminate the collision chain, which can be written atomically to the tag field. Atomic entry invalidation is required for thread-private as well as thread-shared caches on cache consistency events (see Section 7), as blocks must be invalidated in all threads' caches by the thread processing the event. For thread-private tables, the owning thread can clean up the sentinel and perform deletion shifting on its own table when back in runtime system code. For thread-shared tables, we cannot do any shifting or replacement of a sentinel unless we know all threads have exited the cache since the sentinel's insertion.

Resizing is the most difficult of the three operations. As there is a large range in amount of code executed by different applications, no single table size will provide both small data cache footprint and small collision chains—the table must be dynamically sized as the application executes new code. Thread-private lookup tables can be resized by their owner at any point. For thread-shared tables, we point at the new table but do not free the old table right away. A reference counting and timestamp scheme similar to that used for shared block deletion (Section 7) is used, in one embodiment, to lazily reclaim the memory.

After implementing both thread-private and thread-shared lookup tables, we have observed thread-private to be marginally faster, possibly due to shared tables' lack of sentinel replacement resulting in longer collision chains.

Lookup routines can also be either shared or private. Shared routines must use indirection to access their lookup tables (unless a hardcoded table size is used, which does not scale well, or several registers are permanently stolen, which will have serious performance problems on IA-32), another disadvantage of sharing. Our shared routines store table addresses and lookup masks directly in thread-local storage (Section 3) in order to avoid a second indirection step. The best general approach may be a hybrid that uses thread-private lookup routines and tables but switches to thread-shared if the application turns out to use many threads with significant sharing.

7. Code Cache Eviction

Figure 7:
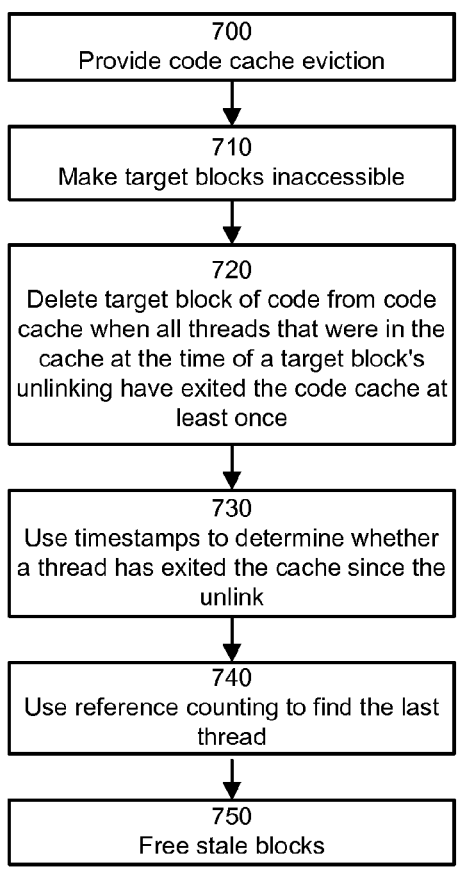
FIG. 7 depicts a process for providing code cache eviction.
Figure 8:
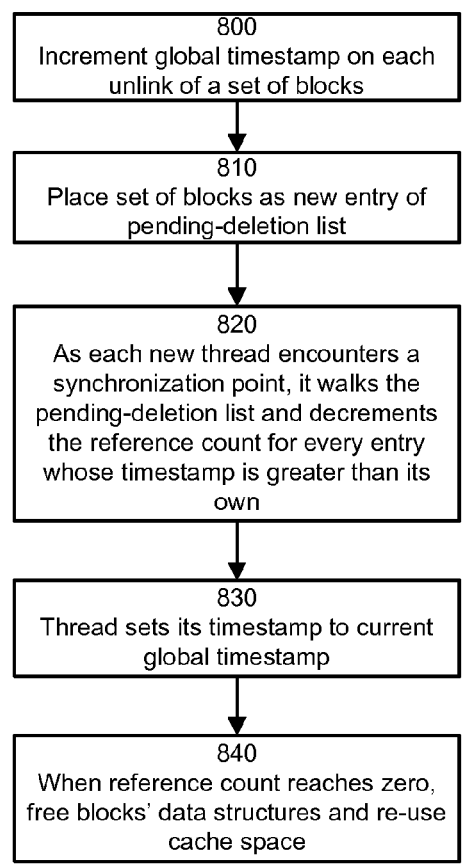
FIG. 8 depicts a process for use in code cache eviction in which timestamps are used to determine whether a thread has exited a cache since a last unlink and a reference counter is used to find the last thread.

FIG. 7 depicts a process for providing code cache eviction and FIG. 8 depicts a process for use in code cache eviction in which timestamps are used to determine whether a thread has exited a cache since a last unlink and a reference counter is used to find a last thread. Step 700 refers to providing code cache eviction. Code must be evicted, or deleted, from software code caches for two reasons: cache consistency and cache capacity. This section shows that while invalidating code by making it unreachable is similar between thread-private and thread-shared caches, actually freeing code is very different in the thread-shared world.

7.1 Unlinking

Any software code cache must be kept consistent with the application's original code, which can change due to code modification or de-allocation of memory. These events are more frequent than one might expect and include much more than rare self-modifying code: unloading of shared libraries; rebasing of shared libraries by the loader; dynamically-generated code re-using the same address, or nearby addresses (false sharing) if the method of change detection is not granular enough and dynamically-generated code includes nested-function trampolines and other code sequences not limited to just-in-time compilers; hook insertion, which is frequent on Windows; and rebinding of jump tables. All of these application changes must be handled by invalidating the corresponding code in the code cache. Our experience running commercial server software revealed as a common source of bugs attempts to execute from already unloaded libraries. Rather than data corruption these latent bugs more often result in execution exceptions that are handled within the application, and our platform has to faithfully reproduce those exceptions for bug transparency.

The presence of multiple threads complicates cache invalidation, even with thread-private caches (as stale code could be present in every thread's cache). Bruening and Amarasinghe ("Maintaining consistency and bounding capacity of software code caches," International Symposium on Code Generation and Optimization (CGO '05), 74-85) incorporated herein by reference, present an algorithm for non-precise flushing using a slightly relaxed consistency model that is able to invalidate modified code in a lazy two-step scheme that avoids the up-front cost of suspending all threads on every invalidation event. (Self-modifying code is handled differently, in a precise fashion, which is one reason the system keeps self-modifying blocks thread-private). Non-precise flushing assumes that the application uses synchronization between a thread modifying code and a thread executing that code. A code cache system can then allow a thread already inside a to-be-invalidated block to continue executing and only worry about preventing future executions. This results in a two-step scheme: one, making all target blocks inaccessible (step 710), which must be done proactively; and two, actually freeing the stale blocks (step 750), which can be performed lazily. Here, we extend that algorithm and verify that the first step works with the addition of our indirect branch table solution from Section 6, but the second step requires a novel scheme for freeing memory, which we present in Section 7.2.

Methods for removing blocks from indirect branch target tables atomically, concurrent with other threads' access to the table, were discussed in Section 6. In addition, the first step requires unlinking of all target blocks. Unlinking involves redirecting all entrances to and exits from a block (including self-loops) to instead exit the code cache. These redirections involve modifying direct branch instructions. IA-32 provides an atomic four-byte memory write (though despite the implications of the IA-32 documentation, cross-cache-line code modifications are not atomic with respect to instruction fetches). A branch modification is a single write and can be made atomic by ensuring that the branch instruction's immediate operand in the code cache does not cross a processor cache line. This part of the flushing algorithm does not change from thread-private to thread-shared caches.

7.2 Delayed Deletion

While making a block inaccessible in the future can be done in a single operation, actually freeing that block is much more difficult. We must be certain that no thread is currently inside the block. One strategy is to impose a barrier at entrance to the code cache and wait for all threads to exit.

When no thread is in the code cache, clearly any block can be freed. However, with this strategy, threads may remain in the cache for an unbounded amount of time before coming out, if in a loop or at a system call. This leads to two problems: first, freeing of blocks may be delayed indefinitely; and second, the application may make no forward progress because of the cache entrance barrier. A third problem is that the lock used to precisely count the threads as they exit ends up with very high contention (since every thread acquires it on every cache entrance and exit). The end result is both non-prompt deletion and poor performance.

As a real-world example of how important it is to free memory invalidated by cache consistency events, consider VSSTat.exe, the traybar process for McAfee VirusScan. It loads and then unloads the same shared library over one thousand times in the course of a few minutes of execution. While this is clearly suboptimal native behavior, our platform should faithfully maintain the application's characteristics. Yet, without actual block freeing, our overall memory usage was fifty times what it should have been. While a more targeted solution to library reloading can remove this source of cache deletion, page or subpage consistency events due to cross-modified or self-modified code still demand more efficient general deletion support.

In one embodiment, our solution is to not require that all threads be out of the cache simultaneously, but rather that all threads that were in the cache at the time of the target block's unlinking have exited the cache at least once (step 720). This avoids the heavyweight entrance barrier and solves the performance problem. To determine whether a thread has exited since the unlink, we use timestamps (step 730), and to find the last thread, reference counting (740). Steps 730 and 740 are discussed further in FIG. 8. A global timestamp is incremented on each unlink of a set of blocks (e.g., for each cache consistency event) (step 800). That set of blocks is placed as a new entry in a pending-deletion list (step 810). The list entry also records the global timestamp and the total number of threads at the time of the unlink (which is the reference count). We use the total to avoid having to know how many threads are in the cache versus waiting at synch points. Furthermore, requiring every thread to indicate it is no longer using the set of blocks solves problems not only with stale code cache execution but with stale accesses to data structures associated with stale blocks.

Each thread remembers the timestamp at which it last walked the pending-deletion list. As each thread encounters a synchronization point (entering or exiting the cache, or thread death), it walks the pending-deletion list and decrements the reference count for every entry whose timestamp is greater than the thread's (step 820). After the walk, the thread sets its timestamp to the current global timestamp (step 830). The pending-deletion list can optionally be kept sorted (by prepended new entries) so that each walk can terminate at the first entry that has already been visited by that thread.

When a pending-deletion entry's reference count reaches zero, its blocks are guaranteed to be no longer in use either for execution in the code cache or examination by the runtime system. The blocks' data structures can now be freed, and their cache space re-used (step 840). Re-use of cache space is not as simple as for thread-private caches, where schemes like empty-slot promotion are effective. Victim blocks adjacent to the empty slot cannot be proactively evicted (the multi-stage delayed deletion process must be undergone to ensure they are unused first), making the slots only useful to blocks that fit inside them. One solution is to use free lists of various sizes for shared code caches.

Our delayed deletion algorithm still has one problem: deletion delay is unbounded due to loops and system calls in the cache. We address the system call problem with a flag that is set prior to executing a system call and cleared afterward. If the flag is set for a thread, that thread is not included in the reference count for a to-be-deleted set of target blocks. This scheme requires that during the unlinking step all post-system-call points are also unlinked prior to reading the system call flag. Otherwise a race in reading the flag could result in the uncounted thread accessing stale and freed data. Our system routes all system calls through a single point, facilitating an inexpensive unlink. If system calls are instead scattered throughout the code cache, an always-present check for whether to exit may be more efficient than having to unlink every single one of them. Upon exiting the code cache, the system call thread must abandon any pointer to any blocks (such as a last-executed pointer that some systems maintain) as it may have already been freed.

In practice we have not had a problem with loops. Although a goal is to quickly enter steady state in the form of loops in the cache, server applications' steady-state loops often contain system calls, which our algorithm does address. Another factor is that applications with significant amounts of consistency events tend to exit the cache more frequently as they execute the code being unlinked. If problems with loops do arise, as a last resort one can occasionally suspend the looping threads in order to proactively free memory.

In addition to freeing blocks made invalid by consistency events, freeing is required in order to impose limits on the size of the cache for capacity management. Unfortunately, straightforward single-block eviction strategies such as first-in-first-out or least-recently-used that have been shown to work well with thread-private caches simply do not work with thread-shared caches, as no block can be freed immediately in an efficient manner. Capacity schemes must account for either a high cost of freeing or for a delay between asking for eviction and actual freeing of the space.

8. Related Work

Software code caches are found in a variety of systems. Dynamic translators use code caches to reduce translation overhead, while dynamic optimizers perform native-to-native translation and optimization using runtime information not available to the static compiler. Similarly, just-in-time (JIT) compilers translate from high-level languages to machine code and cache the results for future execution. Instruction set emulators and whole-system simulators use caching to amortize emulation overhead. Software code caches are also coupled with hardware support for hardware virtualization and instruction set compatibility. To avoid the transparency and granularity limitations of inserting trampolines directly into application code, recent runtime tool platforms are being built with software code caches.

Not all software code cache systems support multiple threads. Whole-system simulators, hardware virtualization systems, and instruction set compatibility systems typically model or support only a single processor, resulting in a single stream of execution (an exception is VMWare's multiprocessor support, but for which no technical information is available). Other tools and research systems target platforms on which kernel threads are not standard.

Many dynamic translation and instrumentation systems that do support threads have limited solutions to threading issues. Valgrind is single-threaded and multiplexes user threads itself. Aries uses a single global lock around runtime system code and supports freeing cache space only via forcing all threads out of the cache. DynamoRIO originally used thread-private code caches. FX!32 supports multiple threads but does not support cache consistency or runtime cache management, using only persistent caches built via offline binary translation. Mojo uses thread-shared trace caches but thread-private basic block caches. Its cache management consists of suspending all threads, which it only does upon reaching the capacity limit of the cache as it does not maintain cache consistency and cannot afford the suspension cost at more frequent intervals. Pin has an adaptive thread-local storage approach, using absolute addressing until a second thread is created, when it switches to a stolen register. Further information on its handling of threads is not available.

Some threading problems are more easily solved in other types of runtime systems. Dynamic translators and just-in-time compilers are able to set up their own thread-local scratch space by allocating themselves a register, as opposed to native-to-native systems that must steal from the application in order to operate transparently.

Language virtual machines (e.g., Java virtual machines) often virtualize the underlying processors and perform thread scheduling themselves. They do not allow full pre-emption but rather impose synchronization points where thread switches may occur, typically at method entry points or loop backedges. These points are used to simplify garbage collection by requiring all mutators (application threads) to be at synchronization points before garbage collection can proceed. The overhead from such frequent synchronization is more acceptable in a virtual machine than a native-to-native system.

Garbage collection uses reference counting in a different way than our delayed deletion algorithm. Garbage collection determines what data is reachable from a root set, operating either in a stop-the-world fashion or by instrumenting stores to ensure that any references between collection sets are known. Deleting code blocks cannot use similar methods as instrumenting every block entrance and exit would be prohibitively expensive. Any thread can reach any block that is accessible via links or indirect branch lookup tables. Our reference count indicates not which threads are using target data, but which threads might be using target data.

Another difference between language virtual machines and other systems is that JIT-compiled code cache management operates at a coarser granularity, methods, than the blocks of code required for incremental code discovery in a system operating on arbitrary binaries. JIT compilers often go to great lengths to avoid compiling code that might ever need invalidation.

Figure 9:
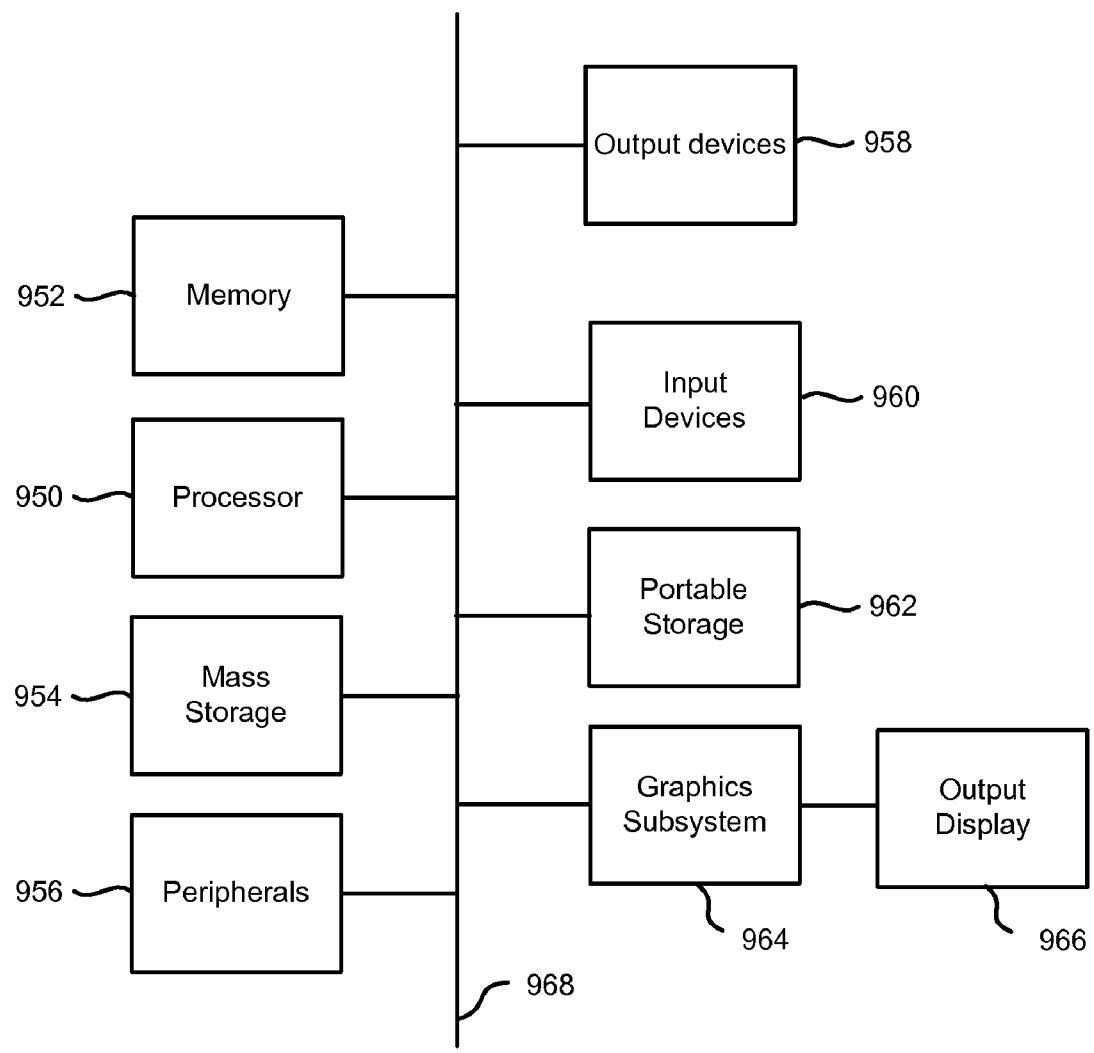
FIG. 9 illustrates an embodiment of a computing system in which the present invention may be implemented.

FIG. 9 illustrates an embodiment of a computing system 900 in which the present invention may be implemented. The computer system 900 includes one or more processors 950 and main memory 952. Main memory 952 stores, in part, instructions and data for execution by processor unit 950. If the system of the present invention is wholly or partially implemented in software, main memory 952 can store the executable code when in operation. The system further includes a mass storage device 954, peripheral device(s) 956, user input device(s) 960, output devices 958, portable storage medium drive(s) 962, a graphics subsystem 964 and an output display 966. For purposes of simplicity, the components shown are depicted as being connected via a single bus 968. However, the components may be connected through one or more data transport means. For example, processor unit 950 and main memory 952 may be connected via a local microprocessor bus, and the mass storage device 954, peripheral device(s) 956, portable storage medium drive(s) 962, and graphics subsystem 964 may be connected via one or more input/output (I/O) buses. Mass storage device 954, which may be implemented with a magnetic disk drive or an optical disk drive, is a non-volatile storage device for storing data and instructions for use by processor unit 950. In one embodiment, mass storage device 954 stores the system software for implementing the present invention for purposes of loading to main memory 952.

Portable storage medium drive 962 operates in conjunction with a portable non-volatile storage medium, such as a floppy disk, to input and output data and code to and from the computer system of FIG. 9. In one embodiment, the system software for implementing the present invention is stored on such a portable medium, and is input to the computer system via the portable storage medium drive 962. Peripheral device(s) 956 may include any type of computer support device, such as an input/output (I/O) interface, to add additional functionality to the computer system. For example, peripheral device(s) 956 may include a network interface for connecting the computer system to a network, a modem, a router, etc.

User input device(s) 960 provides a portion of a user interface. User input device(s) 960 may include an alpha-numeric keypad for inputting alpha-numeric and other information, or a pointing device, such as a mouse, a trackball, stylus, or cursor direction keys. In order to display textual and graphical information, the computer system includes graphics subsystem 964 and output display 966. Output display 966 may include a cathode ray tube (CRT) display, liquid crystal display (LCD) or other suitable display device. Graphics subsystem 964 receives textual and graphical information, and processes the information for output to display 966. Additionally, the system 900 includes output devices 958. Examples of suitable output devices include speakers, printers, network interfaces, monitors, etc.

The components contained in the computer system 900 are those typically found in computer systems suitable for use with the present invention, and are intended to represent a broad category of such computer components that are well known in the art. Thus, the computer system 900 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Furthermore, the technology described herein can be implemented using hardware, software, or a combination of both hardware and software. The software used is stored on one or more processor readable storage devices including hard disk drives, CD-ROMs, DVDs, optical disks, floppy disks, tape drives, RAM, ROM, flash memory or other suitable storage devices for programming one or more processor to perform the techniques described above. In alternative embodiments, some or all of the software can be replaced by dedicated hardware including custom integrated circuits, gate arrays, FPGAs, PLDs, and special purpose processors. In one embodiment, the software is used to program one or more processors. The one or more processors can be in communication with one or more storage devices, peripherals and/or communication interfaces.

9. Conclusions

An implementation of thread-shared code caches is provided that avoids brute-force all-thread-suspension and monolithic global locks. One embodiment includes medium-grained runtime system synchronization that reduces lock contention, trace building that combines efficient private construction with shared results, in-cache lock-free lookup table access in the presence of entry invalidations, and a delayed deletion algorithm based on timestamps and reference counts.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for using a code cache, comprising:
   caching code; and
   sharing the cached code among multiple threads while avoiding brute-force all-thread suspension;
   unlinking a block of code from the cached code to make it unreachable;
   recording a first timestamp at a time of unlinking of the block of code;
   using a plurality of second timestamps to determine whether the multiple threads have exited the cache since making the block of code unreachable;
   determining that each thread in the cache has exited the cache since making the block of code unreachable; and
   freeing the block of code based on the determination that each thread in the cache has exited the cache since making the block of code unreachable.

2. The computer implemented method of claim 1, wherein unlinking the block of code to make it unreachable is executed prior to removing the block of code.

3. The computer implemented method of claim 1, wherein deleting a block of code from the code cache comprises deleting the block of code from the code cache when all threads that were in the cache at the time of making the block of code unreachable have exited the code cache at least once.

4. The computer implemented method of claim 1, further comprising, at the time of the unlinking of the block of code, recording a number of threads in the block of code as a reference count.

5. The computer implemented method of claim 4, wherein using the plurality of second timestamps to determine whether a thread has exited the cache since making the block of code unreachable comprises decreasing the reference count by one each time a thread exits the cache at a time later than the first timestamp.

6. The computer implemented method of claim 5, wherein determining that each thread in the cache has exited the cache since making the block of code unreachable comprises determining that the reference count is zero.

7. A computer, comprising:
   a storage device;
   a communication interface; and
   one or more processors in communication with the storage device and the communication interface, the one or more processors being programmed to:
   implement a code cache that is shared among different threads while avoiding brute-force all-thread suspension;
   unlink a block of code from the cached code to make it unreachable;
   record a first timestamp at a time of unlinking of the block of code;
   use a plurality of second timestamps to determine whether the multiple threads have exited the cache since making the block of code unreachable;
   determine that each thread in the cache has exited the cache since making the block of code unreachable; and
   free the block of code based on the determination that each thread in the cache has exited the cache since making the block of code unreachable.

8. The computer of claim 7, wherein at the time of the unlinking of the block of code the one or more processors are further programmed to record a number of threads in the block of code as a reference count.

9. The computer of claim 8, wherein using the plurality of second timestamps to determine whether a thread has exited the cache since making the block of code unreachable comprises decreasing the reference count by one each time a thread exits the cache at a time later than the first timestamp.

10. The computer implemented method of claim 9, wherein determining that each thread in the cache has exited the cache since making the block of code unreachable comprises determining that the reference count is zero.

11. One or more non-transitory processor readable storage devices storing processor readable code, the processor readable code for programming one or more processors to perform a method comprising:
    implementing a code cache;
    sharing the code cache among threads while avoiding brute-force all-thread-suspension;
    unlinking a block of code from the cached code to make it unreadable;
    recording a first timestamp at a time of unlinking of the block of code;
    using a plurality of second timestamps to determine whether the multiple threads have exited the cache since making the block of code unreachable;
    determining that each thread in the cache has exited the cache since making the block of code unreachable; and
    freeing the block of code based on the determination that each thread in the cache has exited the cache since making the block of code unreachable.

12. The one or more non-transitory processor readable storage devices of claim 11, wherein the processor readable code for programming one or more processors to perform a method further comprises, at the time of the unlinking of the block of code, recording a number of threads in the block of code as a reference count.

13. The one or more non-transitory processor readable storage devices of claim 12, wherein using the plurality of second timestamps to determine whether a thread has exited the cache since making the block of code unreachable comprises decreasing the reference count by one each time a thread exits the cache at a time later than the first timestamp.

14. The one or more non-transitory processor readable storage devices of claim 13, wherein determining that each thread in the cache has exited the cache since making the block of code unreachable comprises determining that the reference count is zero.

* * * * *